United States Patent
Bogle

(10) Patent No.: US 10,513,397 B2
(45) Date of Patent: Dec. 24, 2019

(54) CONTROL SYSTEM FOR DETECTING AND CORRECTING AN IMBALANCE IN A CONVEYOR SYSTEM

(71) Applicant: Laitram, L.L.C., Harahan, LA (US)

(72) Inventor: David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/066,465

(22) PCT Filed: Dec. 29, 2016

(86) PCT No.: PCT/US2016/069123
§ 371 (c)(1),
(2) Date: Jun. 27, 2018

(87) PCT Pub. No.: WO2017/117354
PCT Pub. Date: Jul. 6, 2017

(65) Prior Publication Data
US 2019/0016538 A1   Jan. 17, 2019

Related U.S. Application Data

(60) Provisional application No. 62/272,862, filed on Dec. 30, 2015.

(51) Int. Cl.
*B65G 23/44* (2006.01)
*B65G 43/02* (2006.01)

(52) U.S. Cl.
CPC .............. *B65G 23/44* (2013.01); *B65G 43/02* (2013.01); *B65G 2203/043* (2013.01); *B65G 2203/044* (2013.01)

(58) Field of Classification Search
CPC .... B65G 2207/24; B65G 21/18; B65G 23/44; B65G 2203/044
USPC .............................. 198/810.04, 778
See application file for complete search history.

(56) References Cited

U.S. PATENT DOCUMENTS

| | | | | |
|---|---|---|---|---|
| 4,372,172 A | * | 2/1983 | Gombocz | G01B 7/042 198/810.04 |
| 5,505,293 A | | 4/1996 | Ochs et al. | |
| 5,743,376 A | | 4/1998 | Ochs | |
| 5,997,423 A | * | 12/1999 | Kwon | B65G 23/44 198/810.04 |

(Continued)

FOREIGN PATENT DOCUMENTS

| | | |
|---|---|---|
| DE | 102005007976 A1 | 8/2006 |
| JP | 10-332342 A | 12/1998 |
| WO | 2013155449 A1 | 10/2013 |

OTHER PUBLICATIONS

European Search Report, European Patent Application No. 16882644.4, dated Jul. 29, 2019, European Patent Office, Munich, Germany.

*Primary Examiner* — James R Bidwell
(74) *Attorney, Agent, or Firm* — Catherine M. Bishop

(57) ABSTRACT

A conveyor control system detects imbalances in a multi-drive conveyor belt and institutes a corrective action to rectify the imbalances. A sensor detects imbalances by measuring gaps between consecutive conveyor modules near a drive for the conveyor belt. A controller can initiate an alarm or automatically modify one or more drives to correct a detected imbalance.

12 Claims, 1 Drawing Sheet

(56) References Cited

U.S. PATENT DOCUMENTS

| | | | | |
|---|---|---|---|---|
| 6,029,799 A | * | 2/2000 | Weigel | B65G 23/36 198/810.04 |
| 7,117,989 B2 | | 10/2006 | Weigel et al. | |
| 7,540,374 B2 | * | 6/2009 | Rathbun | B65G 43/02 198/502.1 |
| 7,987,973 B2 | | 8/2011 | Broe | |
| 8,191,703 B2 | | 6/2012 | Tokhtuev et al. | |
| 8,285,494 B2 | * | 10/2012 | Vozner | G01B 11/028 198/502.1 |
| 8,550,236 B2 | * | 10/2013 | Merten | B65G 23/44 198/502.1 |
| 8,857,604 B2 | * | 10/2014 | Heber | B65G 43/02 198/778 |
| 9,540,176 B2 | | 1/2017 | Matsuzaki et al. | |
| 10,023,397 B1 | | 7/2018 | Brown | |
| 2009/0194391 A1 | | 8/2009 | Lagneaux | |
| 2013/0112530 A1 | * | 5/2013 | Fujii | G03G 15/1615 198/617 |
| 2015/0353285 A1 | * | 12/2015 | Matsuzaki | B65G 17/063 198/778 |

* cited by examiner

CONTROL SYSTEM FOR DETECTING AND CORRECTING AN IMBALANCE IN A CONVEYOR SYSTEM

RELATED APPLICATIONS

This application claims priority to U.S. Provisional Patent Application Ser. No. 62/272,862, filed Dec. 30, 2015 and entitled "Control System for Detecting and Correcting an Imbalance in a Conveyor System", the contents of which are herein incorporated by reference.

FIELD OF THE INVENTION

The present invention relates to power-driven conveyors. More particularly, the present invention relates to a control system for detecting an imbalance in a conveyor system.

BACKGROUND OF THE INVENTION

Conveyor belts are typically used for conveying bulk material, such as foodstuffs or other materials, through a processing environment or from one location to another. Typical conveyor belts have the advantage that relatively little energy is required for transporting the bulk material. Certain conveyor belts employ multiple drives. For example, one or more intermediate drives may be used to drive a conveyor belt along an extended, winding or spiral conveyor path.

In conveyor systems that employ multiple drives for a conveyor belt, controls can be a problem. If the drives are not synchronized, the system can become imbalanced, potentially resulting in stress-related damage. Currently, detection and correction of imbalances must be done manually, which is imprecise and unreliable.

SUMMARY OF THE INVENTION

A conveyor control system detects imbalances in a multi-drive conveyor belt and institutes a corrective action to rectify the imbalances. A sensor detects imbalances by measuring gaps between consecutive conveyor modules near a drive for the conveyor belt. Gaps in the conveyor belt after exiting a drive indicate an imbalance, while lack of gaps before the drive also indicates an imbalance. A controller can initiate an alarm or automatically modify one or more drives to correct a detected imbalance.

DETAILED DESCRIPTION

Figure 1:
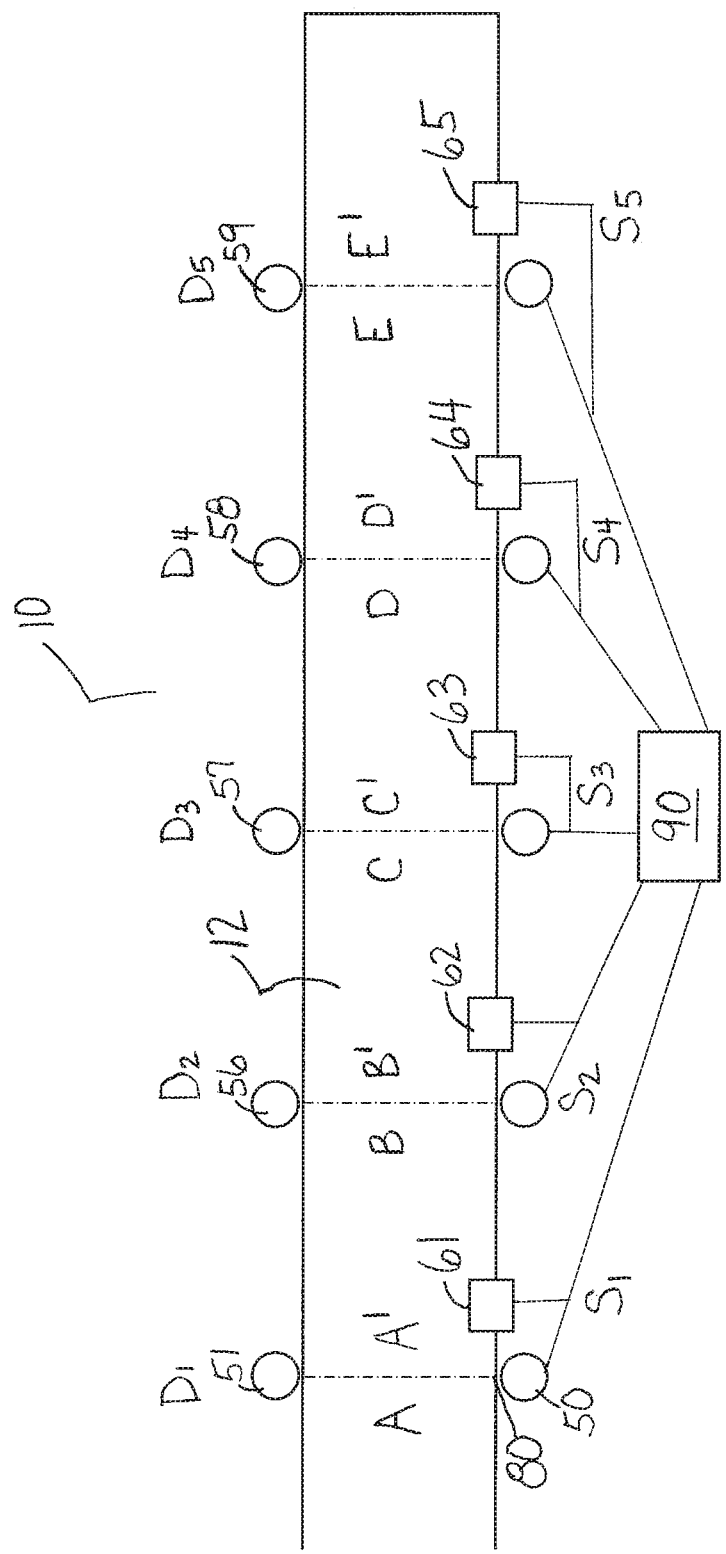
FIG. 1 is a schematic overhead view of a multi-drive conveyor system including sensors for detecting an imbalance in the conveyor belt.

A control system detects imbalances in a conveyor and implements automated corrective strategies. The invention will be described below relative to certain illustrative embodiments, though one skilled in the art will recognize that the invention is not limited to the illustrative embodiments.

Referring to FIG. 1, a conveyor system 10 conveys articles along a conveyance path. The belt conveyor includes a conveyor belt 12, which may be a modular plastic conveyor belt, or another type of conveyor belt, driven by a plurality of drives 50-59 at various locations $D_1$-$D_5$ along the conveyance path. The illustrative conveyor system 10 includes paired drives at five drive locations, with a drive driving drive elements on each side edge of the conveyor belt at each drive location. The conveyor is not limited to the illustrative drive configuration, and the conveyor system can include any suitable number of drives, paired or unpaired, at any suitable location, and the drives can have any suitable spacing therebetween. The illustrative drive 50-59 comprise round sprockets that engage drive elements on the side edge of the conveyor belt, but the invention is not so limited. The drive can be an I-drive from the bottom of the belt, a magnetic LIM drive or any suitable drive.

The conveyor 10 is not limited to a straight conveyor, and the conveyor could be curved, spiral, in the shape of a racetrack any other configuration.

The conveyor further includes sensors 61-65 in the vicinity of the drives 50-59 on one side of the conveyor belt 12. In one embodiment, each sensor 61-65 measures the tension in the conveyor belt 12 immediately after the conveyor belt exits the corresponding drive. In another embodiment, a sensor measures tension before the drive.

When tensioned, a modular plastic conveyor belt stretches to the belt pitch. When relaxed (pushed instead of pulled), the modules collapse like a rope. The sensors 61-65 measure to make sure that the modules properly collapse after a drive and-or are stretched out before a drive.

While the illustrative sensors 61-65 are located at the edge of a belt, the invention is not so limited, and a sensor can detect an imbalance from anywhere across the width of the belt. In one embodiment, a sensor is located below a conveyor belt to prevent interference from a conveyed product on the belt.

A controller 90 receives signals from the sensors 61-65 and institutes a corrective action if a tension sensor detects an imbalance in the conveyor belt.

In a balanced system, the tension in the conveyor belt 12 immediately after a drive should be zero or about zero. For example, a modular plastic conveyor belt should be collapsed after a drive, indicating lack of tension. The conveyor module at a drive contact point 80 experiences the greatest amount of tension as it pulls the load from that point to the immediate upstream drive contact point. The tension in the conveyor belt 12 immediately prior to each drive should be at a maximum. Highest tension is indicated by the modules entering the drive being fully separated.

The number of "collapsed" rows in the conveyor belt 12 after exiting a drive should be limited, as product orientation at each of the collapsed areas can be lost. On the other hand, when there are no collapsed rows, the sprocket tooth may not provide any pull to the belt and the downstream drive has to carry more load, causing imbalance in the system and potentially resulting in stress related damages.

In the embodiment shown in FIG. 1, the first sensor 61 measures the tension in the belt in area A'. For example, the first sensor 61 can measure the gap between modules after exiting the drive to detect whether the belt has properly collapsed. If gaps above a particular size are present, indicative of tension remaining in the belt and instability in the system, the controller 90 in communication with the sensor 61 takes corrective action. For example, the controller 90 can sound an alarm or send a signal adjusting the speed of one or more of the drives 50-59. Alternatively, if the motors for the drives are locked on speed together, the controller could disengage a clutch or other device to allow a particular drive to slip to correct an imbalance.

An example of a suitable sensor is a laser sensor available from Keyence Corporation of America, comprising a light beam emitter and a receiver. The light beam emitter is disposed above the conveyor belt 12 and directs a laser beam into the edge of the conveyor belt. A receiver below the conveyor belt 12 opposite the laser receives the beam to detect gaps in the side edge. Based on the presence or absence of gaps or the size of gaps, the sensor determines whether appropriate bunching of conveyor modules is occurring and tension is released from the belt. Other means for measuring tension may be used and the invention is not limited to measuring gaps between modules to determine tension or detect an imbalance.

Any suitable sensor for detecting an imbalance in a conveyor belt may be used. For example, the sensor can be a proximity sensor, magnetic sensor, infrared sensor or any other suitable type of sensor.

Alternative to measuring gaps between modules, the conveyor belt may include magnets or another detectable material that the sensor can measure to detect imbalances.

For a spiral conveyor, the drives may comprise sprocket towers, each comprising a series of sprockets mounted on drive shafts. A motor drives each drive shaft to spin the sprockets. The illustrative embodiment includes four sprocket towers, though the invention is not so limited. A first sprocket tower is mounted on the outside of the spiral, such that the sprocket teeth engage drive elements on the outer edge of the conveyor belt. A second sprocket tower is opposite the first sprocket tower engages drive elements in the inner edge of the conveyor belt. Other sprocket towers drive the conveyor belt in other locations. In one embodiment, a single motor is connected to a pair of sprockets towers. Alternatively, the sprocket towers may be independently driven. The motors may vary the speed of the sprockets depending on information from sensors, as described above, or based on other information.

The invention is not limited to the illustrative embodiments.

What is claimed is:

1. A method of controlling a conveyor belt, comprising the steps of:
   detecting an imbalance in a conveyor belt by measuring a gap between conveying belt modules using a sensor adjacent to an edge of the conveyor belt before a drive contact point to ensure full separation of the conveyor belt modules; and
   automatically instituting a corrective action based on a reading from the sensor.

2. The method of claim 1, wherein the drive comprises a side drive that engages drive elements on the edge of the conveyor belt.

3. The method of claim 1, wherein the corrective action comprises adjusting the speed of the drive.

4. The method of claim 1, wherein the sensor comprises a lighter emitter above the edge of the conveyor belt and a light receiver below the edge of the conveyor belt for detecting the gap between consecutive conveyor belt modules in the conveyor belt.

5. A multi-drive conveyor system, comprising:
   a conveyor belt;
   a first drive driving the conveyor belt at a first location;
   a second drive driving the conveyor belt at a second location; and
   a tension sensor adjacent the first drive for detecting a presence or absence of gaps between conveyor belt modules in the conveyor belt near the first drive, wherein an absence of gaps before the first drive indicates an imbalance and a presence of gaps after the first drive indicates an imbalance;
   a controller for instituting a corrective action if the tension sensor detects an imbalance in the conveyor belt.

6. The multi-drive conveyor system of claim 5, wherein the tension sensor comprises a light emitter and a light receiver for detecting gaps between modules in the conveyor belt.

7. The multi-drive conveyor system of claim 5, wherein the tension sensor is located adjacent to an edge of the first belt at the first drive.

8. The multi-drive conveyor system of claim 5, wherein the tension sensor measures tension immediately after the conveyor belt exits the first drive.

9. The multi-drive conveyor system of claim 5, wherein the controller initiates an alarm if the tension sensor detects an imbalance in the conveyor belt.

10. The multi-drive conveyor system of claim 5, wherein the controller adjusts the speed of one of the first drive and the second drive if the tension sensor detects an imbalance in the conveyor belt.

11. A method of detecting and correcting an imbalance in a multi-drive conveyor system, comprising the steps of:
    sensing the presence of a gap between modules in the conveyor belt immediately after exiting a sprocket driving the conveyor belt to determine whether the conveyor belt has properly collapsed; and
    adjusting the speed of the sprocket if a gap exists.

12. The method of claim 11, wherein the step of sensing the presence of a gap comprises the step of directing a light beam into an edge of the conveyor belt using a light emitter and receiving the light beam with a receiver if a gap exists.

* * * * *